United States Patent
Shin et al.

(10) Patent No.: US 8,046,757 B2
(45) Date of Patent: Oct. 25, 2011

(54) METHOD FOR INSTALLING ACTIVEX CONTROL

(75) Inventors: Dong-Hyun Shin, Seoul (KR);
Pyoung-oh Yun, Seongnam-si (KR);
Kyu-dong Moon, Seoul (KR)

(73) Assignee: NHN Corporation, Seongnam-si (KR)

( * ) Notice: Subject to any disclaimer, the term of this patent is extended or adjusted under 35 U.S.C. 154(b) by 1093 days.

(21) Appl. No.: 11/845,646

(22) Filed: Aug. 27, 2007

(65) Prior Publication Data
US 2008/0046884 A1    Feb. 21, 2008

Related U.S. Application Data

(63) Continuation-in-part of application No. PCT/KR2005/004488, filed on Dec. 23, 2005.

(30) Foreign Application Priority Data

Feb. 25, 2005 (KR) .................. 10-2005-0015940
Feb. 25, 2005 (KR) .................. 10-2005-0015942

(51) Int. Cl.
*G06F 9/445* (2006.01)
(52) U.S. Cl. .................. 717/178; 717/168; 717/173
(58) Field of Classification Search .................. None
See application file for complete search history.

(56) References Cited

U.S. PATENT DOCUMENTS
7,770,222 B2 *  8/2010  Hopen et al. ............. 726/22

FOREIGN PATENT DOCUMENTS

| KR | 10-2001-0104165 | 11/2001 |
| KR | 10-2004-0041138 | 5/2004 |
| KR | 10-2004-0070111 | 8/2004 |
| KR | 10-2005-0018556 | 2/2005 |
| WO | WO 03/029977 A2 | 4/2003 |

OTHER PUBLICATIONS

International Search Report dated Apr. 10, 2006 (International Application No. PCT/KR2005/004488).
Korean Office Action issued Jul. 27, 2006 in Korean Patent Application No. 10-2005-0015940.

* cited by examiner

*Primary Examiner* — Chuck Kendall
(74) *Attorney, Agent, or Firm* — H.C. Park & Associates, PLC

(57) ABSTRACT

A method for installing ActiveX controls is disclosed. The method comprises transmitting a webpage to a user client, the webpage containing information of an ActiveX control necessary for the operation of the webpage in the form of a parameter; and receiving ActiveX control request information included in the parameter from the user client; wherein the webpage contains information of an integrated installer ActiveX control, which includes a module for installing the ActiveX controls necessary for the operation of the webpage in the form of an OBJECT tag, and contains script, which calls the module of the integrated installer ActiveX control and controls the installation of the ActiveX controls necessary for the operation of the webpage; and through the control of the script, the user client determines whether or not the ActiveX controls necessary for the operation of the webpage is installed and downloads ActiveX controls that need to be installed.

18 Claims, 13 Drawing Sheets

FIG. 3

```
webpage
<OBJECT>
Integrated Installer ActiveX
</OBJECT>
<script>
{Script for Installing ActiveX}
</script>
```

FIG. 7

| 700 | 702 | 704 | 706 | 708 | 710 | 712 | 714 |
|---|---|---|---|---|---|---|---|
| Control Title | Category | File Name | Address | Installation Path | Version | Size | Time |

METHOD FOR INSTALLING ACTIVEX CONTROL

CROSS-REFERENCE TO RELATED APPLICATIONS

This application is a continuation-in-part application under 35 U.S.C. §365 (c) claiming the benefit of the filing date of PCT Application No. PCT/KR2005/004488 designating the United States, filed Dec. 23, 2005. The PCT Application was published in English as WO 2006/090974 on Aug. 31, 2006, and claims the benefit of the earlier filing date of Korean Patent Application No. 10-2005-0015940, filed Feb. 25, 2005, and Korean Patent Application No. 10-2005-0015942, filed Feb. 25, 2005. The contents of the Korean Patent Application Nos. 10-2005-0015940 and 10-2005-0015942 and the International Application No. PCT/KR2005/004488 including its publication are incorporated herein by reference in their entirety.

BACKGROUND

1. Field

The present invention relates to a method for installing program modules for operating a webpage, and in particular, to a method for installing ActiveX controls for operating a webpage.

2. Description of the Related Technology

ActiveX controls are reusable software components that can be used in connection with web pages over the Internet. ActiveX controls can be downloaded and executed by a Web browser. ActiveX controls can be developed in a variety of languages, including C, C++, Visual Basic, and Java. ActiveX controls allow provision of interactive web services.

In prior art, ActiveX control data was inserted in a webpage in a form of OBJECT tags. An example of ActiveX control data inserted in a webpage is as follows.

<OBJECT ID="ChatObj" CLASSID="CLSID: 253380F7-1A0F-4C11-B218-C0E7E8E8C940" width=0 height=0 codebase="http://220.75.249.252/control/entoichatctrl.cab#version=1,0,1,54">

When ActiveX control data is inserted in a webpage as described above, a web browser displays a security warning message and then inquires the user whether to install the ActiveX control of the data included in the webpage.

These security warning messages incur uneasiness for inexperienced computer users. In many cases, users intentionally or inadvertently fail to install even a crucial ActiveX control for the operation of the webpage and are denied web services. In particular, as the security warning messages are recently being displayed on the upper portion of a web browser and not in a form of pop-ups, ActiveX controls are often not installed, even in cases where it is necessary to install the ActiveX controls, because the security warning messages go unnoticed.

When ActiveX controls are embedded in a form of OBJECT tags, a web browser displays security warning messages for security purposes. Since a warning message which requests the user's consent is displayed for each webpage of a service provider, even for a trusted service provider, users experience inconvenience of repeatedly clicking consent buttons for each page to install the ActiveX controls.

SUMMARY OF CERTAIN INVENTIVE ASPECTS

In one embodiment, a method of installing ActiveX controls without security warning messages for running webpages is provided. ActiveX controls required for running webpages of the same service provider can be installed by a pre-installed integrated installer ActiveX control according to one embodiment.

In another embodiment, a method of installing ActiveX controls is provided to permit user-friendly web service access. ActiveX controls for webpages of certain service providers trusted by a user can be installed without security warning messages.

One embodiment provides a method of installing an integrated ActiveX control installer. The method comprises: accessing, by a terminal associated with a user, an Internet webpage; displaying, on a screen associated with the terminal, an inquiry to the user as to whether the user agrees to install an integrated ActiveX control installer in the terminal; upon agreement by the user, sending, by the terminal, a request for the integrated ActiveX control installer; receiving, by the terminal, data for installing the integrated ActiveX control installer; and installing, in the terminal, the integrated ActiveX control installer using the data, wherein the integrated ActiveX control installer is configured to maintain a list of predetermined ActiveX control objects and further configured to determine whether a first ActiveX control object is included in the list when the terminal attempts to receive a web content requiring the first ActiveX control object for viewing or processing the web content.

The integrated ActiveX control installer may be also an ActiveX control object. The Internet webpage may include information on the integrated ActiveX control installer, and the information may comprise an OBJECT tag and an Internet address from which the integrated ActiveX control installer is available for downloading. The method may further comprise accessing a first webpage associated with the web content, wherein the first webpage includes information associated with the first ActiveX control object. The information associated with the first ActiveX control object may be in the form of an XML parameter.

The first webpage may not include an Internet address from which the first integrated ActiveX control installer is available for downloading. The integrated ActiveX control installer may be further configured to receive an index file including information on the predetermined ActiveX control objects. The Internet webpage may be one of associated webpages provided by an Internet service provider, and at least one of the predetermined ActiveX control objects may be required for viewing or processing web contents available from the associated webpages. The associated webpages may share at least a portion of their URLs.

Another embodiment provides a method of managing an ActiveX control, the method comprising: accessing, by a terminal associated with a user, an Internet webpage comprising a content, which requires a first ActiveX control object to view or process the content, wherein the terminal comprises an integrated ActiveX control installer that has been installed therein, wherein the integrated ActiveX control installer comprises a list of predetermined ActiveX control objects for installing in the terminal; executing the integrated ActiveX control installer so as to determine whether the first ActiveX control object is included in a list of predetermined ActiveX control objects; upon determining that the first ActiveX control object is included in the list, requesting the first ActiveX control object without inquiring to the user whether the user agrees to install the ActiveX control object; receiving data for installing the first ActiveX control object; and installing the first ActiveX control object in the terminal so as to enable the terminal to view or process the content.

The integrated ActiveX control installer may further determine whether the first ActiveX control object has been installed in the terminal. The terminal may receive the data for installing the first ActiveX control object from a server other than a server for the Internet webpage. The integrated ActiveX control installer may be also an ActiveX control object.

Another embodiment provides a method of installing an integrated ActiveX control installer, the method comprising: receiving, by a server, a request for an integrated ActiveX control installer from a terminal connected to the server via the Internet; and transmitting, by a server, data for installing the integrated ActiveX control installer to the terminal, wherein the integrated ActiveX control installer is configured to maintain a list of predetermined ActiveX control objects and further configured to determine whether a first ActiveX control object is included in the list when the terminal attempts to receive a web content requiring the first ActiveX control object for viewing or processing the web content. The server may comprise two or more networked computers, wherein receiving and transmitting are carried out by a single computer or two computers belonging to the two or more networked computers.

Yet another embodiment provides a method of installing an integrated ActiveX control installer, the method comprising: receiving, from a terminal, a request for a webpage; and transmitting, from a server of the webpage to the terminal, data configured to initiate an installation process of an ActiveX control object in the terminal, wherein the installation process requires a consent for the installation by a user of the terminal; wherein the ActiveX control object is an integrated ActiveX control installer, which is configured to maintain a list of predetermined ActiveX control objects, wherein the integrated ActiveX control installer is further configured to determine whether a first ActiveX control object is included in the list when the terminal attempts to receive a first web content requiring the first ActiveX control object for viewing or processing the first web content. The data may further comprise an Internet address from which the integrated ActiveX control installer is available for downloading. The requested webpage may comprise a second web content, which requires a second ActiveX control object to view or process the second web content; wherein the list comprises the second ActiveX control object.

Another embodiment provides data transmitted via Internet, comprising: a command configured to initiate an installation process, in a computer, of an ActiveX control object for an integrated ActiveX control installer, wherein the integrated ActiveX control installer is configured to maintain a list of predetermined ActiveX control objects and is further configured to determine whether a first ActiveX control object is included in the list when the computer attempts to receive a first web content requiring the first ActiveX control object for viewing or processing the first web content; and an Internet address from which the integrated ActiveX control installer is available for downloading. The Data may further comprise information on the integrated ActiveX control installer in the form of an OBJECT tag.

One aspect of the present invention provides a method for installing ActiveX controls comprising transmitting a webpage to a user client, the webpage containing information of an ActiveX control necessary for the operation of the webpage in the form of a parameter; and receiving ActiveX control request information included in the parameter from the user client; wherein the webpage contains information of an integrated installer ActiveX control, which includes a module for installing the ActiveX controls necessary for the operation of the webpage in the form of an OBJECT tag, and contains script, which calls the module of the integrated installer ActiveX control and controls the installation of the ActiveX controls necessary for the operation of the webpage; and through the control of the script, the user client determines whether or not the ActiveX controls necessary for the operation of the webpage is installed and downloads ActiveX controls that need to be installed.

Another aspect of the invention provides a recorded medium containing webpage data comprising a parameter, containing information of at least one ActiveX control necessary for the operation of the webpage; information of an integrated installer ActiveX control, including a plurality of modules which perform the procedures of determining whether or not the ActiveX controls necessary for the operation of the webpage is installed in a user client, and analyzing the information of the parameter to receive the ActiveX controls from an address which provides the ActiveX control necessary for the operation of the webpage; and script, which calls the module of the integrated installer ActiveX control to control installation procedures of the ActiveX control necessary for the operation of the webpage.

Still another aspect of the invention provides a method for integrated installation of ActiveX controls comprising transmitting a webpage to a user client, the webpage containing information of ActiveX controls necessary for the operation of the webpage in the form of a parameter; and receiving ActiveX control request information included in the parameter from the user client; wherein in the webpage, information is included by which a control installation execution file can be installed in the user client, wherein the control installation execution file analyzes the parameter to perform procedures for installing the ActiveX controls necessary for the operation of the webpage, an integrated installer ActiveX control is contained in the form of an OBJECT tag, wherein the integrated installer ActiveX control executes the control installation execution file and includes a plurality of modules for providing the parameter information to the control installation execution file, and script is contained, wherein the script calls the modules of the integrated installer ActiveX control to control the installation of the ActiveX controls necessary for the operation of the webpage.

Another aspect of the invention provides a recorded medium containing webpage data comprising a parameter, containing at least one ActiveX control information necessary for the operation of the webpage; information for installing a control installation execution file in a user client, wherein the control installation execution file analyzes the parameter to perform actions of downloading and installing the ActiveX controls necessary for the operation of the webpage; information of an integrated installer ActiveX control, including a plurality of modules which determine whether or not the ActiveX controls necessary for the operation of the webpage are installed in the user client, provide information of the parameter to the control installation execution file, and execute the control installation execution file; and script, which calls the module of the integrated installer ActiveX control to control procedures of installing the ActiveX controls necessary for the operation of the webpage in the client.

Yet another aspect of the invention provides a method for installing ActiveX controls comprising transmitting a webpage to a user client, the webpage containing a parameter including identification information of ActiveX controls necessary for the operation of the webpage and index file address information; providing an index file to the user client, when a request is received from the user client for index information of the ActiveX controls; and receiving ActiveX control request information necessary for the operation of the webpage from the user client; wherein the webpage contains an integrated installer ActiveX control, which includes a module for installing ActiveX controls necessary for the operation of the webpage in the form of an OBJECT tag, and contains script, which calls the module of the integrated installer ActiveX control and controls the installation of the ActiveX controls necessary for the operation of the webpage; and through the control of the script, the user client receives an index file including detailed information of ActiveX controls necessary for the operation of the webpage using information of the parameter, extracts detailed information of the ActiveX controls necessary for the operation of the webpage from the index file, and downloads the ActiveX controls necessary for the operation of the webpage using the extracted information.

Still another aspect of the invention provides a recorded medium containing webpage data comprising a parameter, containing identification information of at least one ActiveX control information necessary for the operation of the webpage and address information of an index file, the index file including detailed information of ActiveX controls provided by a service provider; information of an integrated installer ActiveX control, including a plurality of modules for performing the procedures of determining whether or not the ActiveX controls necessary for the operation of the webpage are installed in a user client, analyzing the information of the parameter to receive the index file, extracting detailed information of the ActiveX controls necessary for the operation of the webpage using the ActiveX control identification information and information of the index file, and receiving the ActiveX controls necessary for the operation of the webpage using the extracted detailed information; and script, which calls the module of the integrated installer ActiveX control to control installation procedures of the ActiveX controls necessary for the operation of the webpage.

Another aspect of the invention provides a method for installing ActiveX controls comprising transmitting a webpage to a user client, the webpage containing a parameter including identification information of ActiveX controls necessary for the operation of the webpage and index file address information; providing an index file to the user client, when a request is received from the user client for index information of the ActiveX controls; and receiving ActiveX control request information necessary for the operation of the webpage from the user client; wherein in the webpage, information is included by which a control installation execution file can be installed, wherein the control installation execution file analyzes the parameter to perform procedures for installing the ActiveX controls necessary for the operation of the webpage, an integrated installer ActiveX control is contained in the form of an OBJECT tag, wherein the integrated installer ActiveX control executes the control installation execution file and includes a plurality of modules for providing information of the parameter to the control installation execution file, and script is contained, wherein the script calls the modules of the integrated installer ActiveX control to control the installation of the ActiveX controls necessary for the operation of the webpage, and through the control of the script, the user client receives an index file including detailed information of the ActiveX controls necessary for the operation of the webpage using information of the parameter, extracts the detailed information of the ActiveX controls necessary for the operation of the webpage from the index file, and downloads the ActiveX controls necessary for the operation of the webpage using the extracted information.

Yet another aspect of the invention provides a recorded medium containing webpage data comprising a parameter, containing identification information of at least one ActiveX control necessary for the operation of the webpage and address information of an index file; information for installing a control installation execution file in a user client, wherein the control installation execution file analyzes the parameter and receives the index file containing information of ActiveX controls provided by a service provider, extracts detailed information of the ActiveX controls necessary for the operation of the webpage from the index file, and downloads and installs the ActiveX controls necessary for the operation of the webpage using the extracted detailed information; information of an integrated installer ActiveX control, including a plurality of modules which determine whether or not the ActiveX controls necessary for the operation of the webpage are installed in the user client, provide information of the parameter to the control installation execution file, and execute the control installation execution file; and script, which calls the module of the integrated installer ActiveX control to control procedures of installing the ActiveX controls necessary for the operation of the webpage in the client.

BRIEF DESCRIPTION OF THE DRAWINGS

FIG. 3 illustrates a configuration of a webpage provided by a web server according to one embodiment.

FIG. 7 illustrates the field structure of an XML parameter according to the first embodiment.

DETAILED DESCRIPTION OF CERTAIN INVENTIVE EMBODIMENTS

Hereinafter, embodiments of a method for installing ActiveX controls will be described in detail with reference to the accompanying drawings.

Figure 1:
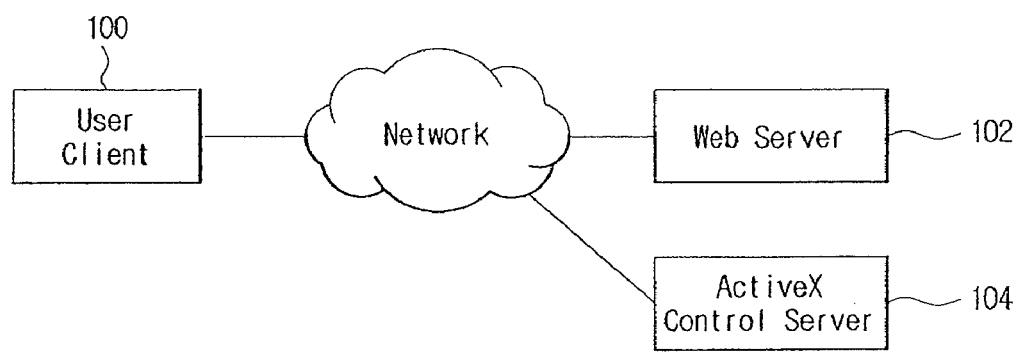
FIG. 1 is a block diagram illustrating one embodiment of a system for installing ActiveX controls.

FIG. 1 illustrates a system for installing ActiveX controls according to one embodiment. Referring to FIG. 1, the system for installing ActiveX controls may include a user client 100, a web server 102, and an ActiveX control server 104. Although FIG. 1 illustrates a structure having the web server 102 and ActiveX control server 104 implemented separately, the functions of the web server 102 and ActiveX control server 104 may be provided by a single integrated server.

In the user client 100, a web browser program is installed which displays webpage data provided by the web server 102. The web browser may be any suitable web browser, such as Internet Explorer, Mozilla Firefox, Safari, Opera, and Netscape.

The user client 100 may include all digital data processing devices which allow communication over a network and operation of web browser applications. Examples of such devices include, but are not limited to desktop computers, PDAs, laptop computers, and cell phones.

In response to request information from the user client 100, the web server 102 provides webpage data over a network to the user client 100. The ActiveX control server 104 stores ActiveX control data necessary for the operation of the webpage, and upon a request from the client 100, transmits the corresponding ActiveX control data to the client 100. As mentioned above, ActiveX control data may also be provided directly from the web server without using a separate ActiveX control server.

In a conventional ActiveX installation system, when particular ActiveX controls are needed for the operation of a webpage, the web server providing the webpage inserts OBJECT tags in the webpage for prompting the installation of the corresponding ActiveX controls when the webpage is to be displayed on a web browser. The OBJECT tags may include information of the corresponding ActiveX controls and codebase information for receiving the ActiveX controls. The term "codebase" refers to information indicative of the location, e.g., an Internet address, where an ActiveX control is available for downloading.

Thus, in a case where a service provider provides various types of webpages, and different ActiveX controls are needed for each webpage, an OBJECT tag including codebase information for installing ActiveX controls is inserted for each if the webpages. Thus, a security warning message for ActiveX control is displayed on the web browser every time a user attempts to view each of the webpages of the service provider.

In one embodiment, a method of minimizing the number of security warning windows for installing ActiveX controls is provided. The method uses an ActiveX control (hereinafter referred to as "integrated installer ActiveX control") installed at the user client 100. The integrated installer ActiveX control is configured to control the installation processes of various types of ActiveX controls provided by a service provider, and install the ActiveX controls needed for running webpages.

According to one embodiment, only the integrated installer ActiveX control is inserted in a webpage in the form of an OBJECT tag including a codebase. An actual ActiveX control necessary for the operation of the webpage is also included in the webpage in the form of an OBJECT tag to be used during the operation of the webpage. However, the OBJECT tag does not include a codebase. The integrated installer ActiveX control automatically installs the required ActiveX control when a user attempts to view the webpage. Thus, when a web browser reads the OBJECT tag of an ActiveX control necessary for the operation of the webpage, the necessary ActiveX control has been already installed by the integrated installer ActiveX control. Thus, the OBJECT tag does not need to include a codebase. In addition, a security warning message need not be displayed.

Only when the integrated installer ActiveX control is installed by the user, a security warning message is displayed on the web browser. When other ActiveX controls provided by the same service provider are installed, there are no security warning messages displayed on the web browser.

According to one embodiment, in the case of a portal site, although a particular ActiveX control may not be required to operate the main page, it is preferable to include an OBJECT tag for installing the integrated installer ActiveX control. Since most users receive the various services provided by the portal site by first connecting to the main page of the portal site, it is preferable that the integrated installer ActiveX control be inserted in the main page in the form of an OBJECT tag including a codebase, so that the ActiveX control required for running subpages may be installed without a security warning window.

Of course, since users may directly access subpages requiring the installation of ActiveX controls without first visiting the main page, the integrated installer ActiveX control can also be inserted in each webpage requiring the installation of ActiveX controls in the form of an OBJECT tag including a codebase.

Once the integrated installer ActiveX control has been installed through the main page or other webpages requiring ActiveX controls, and ActiveX controls necessary for the operation of the webpage are installed by the integrated installer ActiveX control, the OBJECT tag for an ActiveX control required by each webpage does not have to include codebase information. When the web browser reads the corresponding OBJECT tag, no security warning message is displayed, since the ActiveX controls have been already installed.

The method by which the integrated installer ActiveX control installs ActiveX controls necessary for the operation of the webpage without security warning messages will later be described in detail with reference to separate drawings.

According to a first embodiment, ActiveX controls are installed using the integrated installer ActiveX control and the modules (functions) included in the integrated installer ActiveX control. ActiveX controls are installed without security warning messages displayed by script which controls the installation procedures of ActiveX controls necessary for individual pages.

According to a second embodiment, ActiveX controls are installed using the integrated installer ActiveX control, the control installation execution file installed in the user client by the integrated installer ActiveX control, and the functions included in the integrated installer ActiveX control. ActiveX controls are installed without security warning messages displayed by script which controls the installation procedures of ActiveX controls necessary for individual pages.

FIG. 3 illustrates the structure of a webpage provided by a web server according to one embodiment. Referring to FIG. 3, the webpage includes an OBJECT tag for installing the integrated installer ActiveX control. The webpage also includes script which controls the installation procedures of ActiveX controls necessary for individual pages, using modules included in an integrated installer when the integrated installer has been installed.

The OBJECT tag for installing the integrated installer ActiveX control may be written in the same manner as conventional OBJECT tags. As an example, the OBJECT tag for installing the integrated installer ActiveX control may be as follows.

<OBJECT ID="installer" CLASSID="CLSID: 323380F7-1 A0F-4C11-B218-C0E7E8E8C940" width=0 height=0 codebase="http://220.75.249.252/control/installer.cab #version—1,0,1,54"></OBJECT>

If the integrated installer ActiveX control has not been installed in the user client, the integrated installer ActiveX control is installed by means of the above OBJECT tag. In this case, a security warning message is displayed on the web browser. On the other hand, the OBJECT tag of an ActiveX control necessary for the operation of the webpage, as discussed above, does not have to include codebase information.

If the integrated installer ActiveX control has been already installed in the user client, the ActiveX controls necessary for individual pages are installed by the script using modules (functions) of the integrated installer ActiveX control.

Although not illustrated in FIG. 3, a webpage contains a parameter including information of the ActiveX controls necessary for individual pages. The information of the ActiveX controls in the individual pages are checked through the information of the parameter. The installation procedures include downloading and installing the corresponding ActiveX controls.

According to one embodiment, the parameter including information of ActiveX controls necessary for the operation of the webpage is in an XML format. However, the format of the parameter is not limited to XML. Those skilled in the art will appreciate that a parameter in a different format may also be used. For the sake of convenience, the instant disclosure will be described in the context of a case in which an XML parameter is used.

The foregoing descriptions discussed the systems to which the embodiments may be applied and the structure of a webpage according to the embodiments. The method for installing ActiveX controls necessary for the operation of the webpage without security warning messages, using the integrated installer ActiveX control may be implemented in a variety of embodiments. Below are a few of those embodiments, any of which may be modified as needed.

First Embodiment

In a first embodiment, a method for installing ActiveX controls necessary in a webpage uses script which calls the integrated installer ActiveX control and its modules (functions). As described above, the integrated installer ActiveX control is inserted in a webpage in the form of an OBJECT tag.

Figure 4:
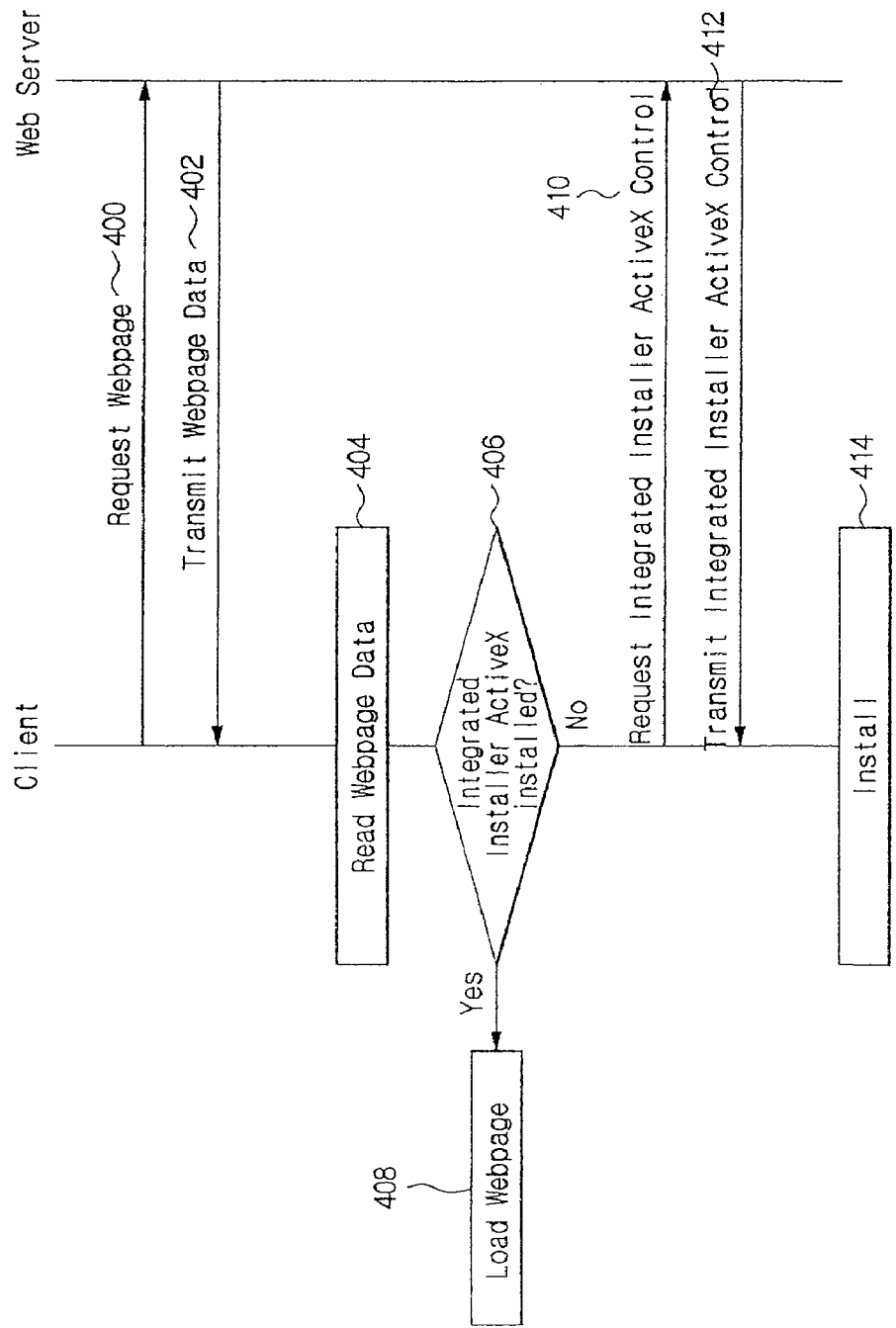
FIG. 4 is a flowchart illustrating a method for installing an integrated installer ActiveX control in a user client according to one embodiment.

FIG. 4 is a flowchart of procedures for installing an integrated installer ActiveX control in a user client according to one embodiment. Referring to FIG. 4, the user client first transmits webpage request information to the web server (step 400). Here, the webpage is a webpage providing the integrated installer ActiveX control. As described above, in one embodiment, the main page of a portal site may include the integrated installer ActiveX control in the webpage data, even though it may not require separate ActiveX controls for its operation. The integrated installer ActiveX control may also be also included for a webpage requiring separate ActiveX controls for operation.

In response to the user's webpage request information, the web server transmits webpage data including the integrated installer ActiveX control in the form of an OBJECT tag to the user client (step 402).

The web browser of the user client, upon receiving the webpage data, reads the webpage data (step 404), and performs procedures for determining whether or not the integrated installer ActiveX control has been installed in the client, using the OBJECT tag included in the webpage (step 406). The OBJECT tag may include the title, file size, version information, and class ID information, etc. of a control. The web browser performs a search on whether or not there is a control which coincides with the conditions included in the OBJECT tag. If the integrated installer ActiveX control has been already installed in the user client, the web browser loads the webpage (step 408).

On the other hand, if the integrated installer ActiveX control has not been installed in the user client, the web browser requests the integrated installer ActiveX control (step 410). The OBJECT tag includes the address information of the integrated installer ActiveX control. The web browser requests the control through the address. Although FIG. 4 illustrates a case in which an ActiveX control is requested through the web server, those skilled in the art will appreciate that the ActiveX control may be requested through a different server, when the address included in the OBJECT tag is an address of a server different from the web server.

The web server receiving the client's request information, or a different server storing the ActiveX control, responds to the client's request information to transmit integrated installer ActiveX control data (step 412). On receiving the integrated installer ActiveX control data, the user client installs it in the client (step 414).

Figure 5:
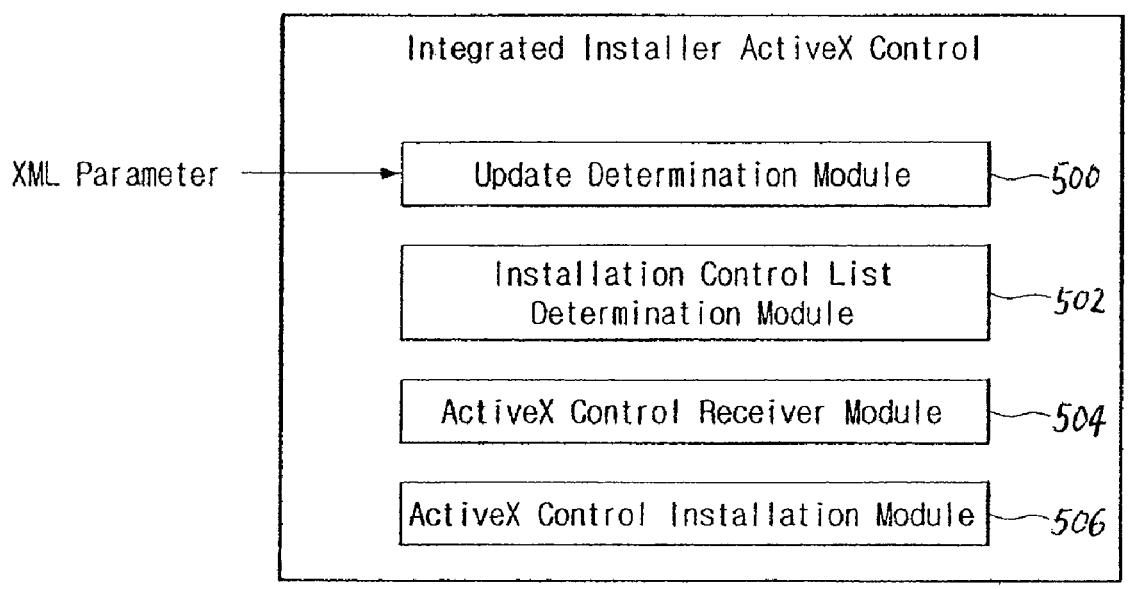
FIG. 5 is a block diagram illustrating the module structure of an integrated installer ActiveX control according to a first embodiment.

FIG. 5 is a block diagram illustrating the module structure of an integrated installer ActiveX control according to the first embodiment. Referring to FIG. 5, an integrated installer ActiveX control may include an update determination module 500, an installation control list determination module 502, an ActiveX control receiver module 504, and an ActiveX control installation module 506.

The update determination module 500 determines the information of the ActiveX controls required by a webpage provided to the client, and determines whether or not the corresponding ActiveX controls are installed in the client. The illustrated update determination module 500 determines the information of an ActiveX control necessary for the operation of the webpage through an XML parameter included in the webpage. As described above, the information of an ActiveX control necessary for the operation of the webpage does not have to be an XML parameter, and may be included in the webpage in various forms.

FIG. 7 illustrates the field structure of an XML parameter according to the first embodiment. Referring to FIG. 7, the XML parameter may include the control title field 700, category field 702, file name field 704, address field 706, installation path field 708, version field 710, size field 714, and time field 716.

The control title field 700 contains the title of the ActiveX control to be installed. For example, if the ActiveX control to be installed is a player for replaying music, the title "music player" may be recorded in the control title field 700.

The category field 702 contains the category information to which the ActiveX control belongs. In one embodiment where a webpage is related to music, a plurality of ActiveX controls are needed, and the plurality of ActiveX controls are managed in the music category. That is, the category field 702 contains the higher category information of the ActiveX controls managed by category. If the ActiveX controls are not managed by category, the category field may be omitted.

The file name field 704 contains the file name information of the ActiveX control to be installed. The address field 706 contains the address information by which the ActiveX control to be installed may be downloaded. The installation path field 708 contains the path information at the local client to which the ActiveX control to be received will be installed. The version field 710, size field 712, and time field 714 contain the version, size, and time information of the ActiveX control file, respectively. It is to be appreciated by those skilled in the art that besides the fields such as those described in FIG. 7, additional information may further be included on a field regarding whether or not a file is registered, an option field relating to file execution, or a field relating to the parameter while executing a file, etc.

Referring back to FIG. 5, if the update determination module 500 outputs the determination information that an ActiveX control necessary for the operation of the webpage has not been installed, the installation control list determination module 502 extracts ActiveX control list information from the XML parameter.

The ActiveX control receiver module 504 requests and receives the ActiveX controls that are to be installed. The address information by which to request the ActiveX controls that are to be installed is included in the XML parameter.

The ActiveX control installation module 506 installs the received ActiveX controls in the client. The ActiveX control installation module 506 installs the ActiveX controls in their corresponding paths according to the installation path field information of the XML parameter, and performs the procedures of registering on the client registry if a registration is required.

The modules (functions) included in the integrated installer ActiveX control described above are called by the script. The script calls the appropriate modules according to the output information of the ActiveX control modules, and controls the installation of ActiveX controls necessary for the operation of the webpage.

Figure 6:
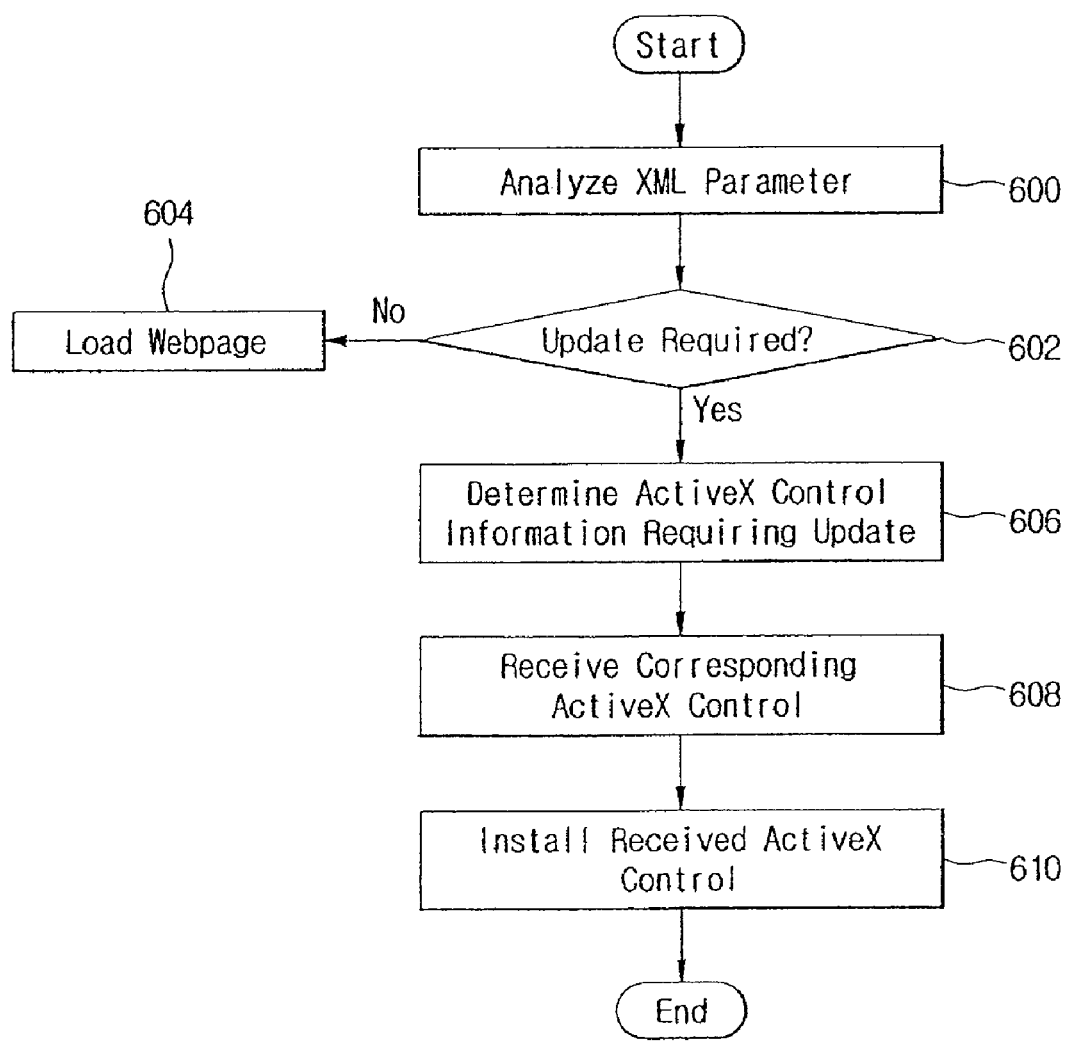
FIG. 6 is a flowchart illustrating a method for installing an ActiveX control according to the first embodiment.

FIG. 6 is a flowchart of a method for installing ActiveX controls according to the first embodiment. Referring to FIG. 6, if particular ActiveX controls are necessary for the operation of the webpage and an integrated installer ActiveX control is installed, the script calls the update determination module of the integrated installer ActiveX control, and the update determination module analyzes the XML parameter included in the webpage (step 600).

The script may also perform procedures of determining whether or not the integrated installer ActiveX control has been installed and is working normally, before step 600.

If the result of analyzing the XML parameter shows that ActiveX controls necessary for the operation of the webpage have been already installed, the script ends the installation procedures of the ActiveX controls, and the webpage is loaded (step 604).

If the result of analyzing the XML parameter shows that ActiveX controls necessary for the operation of the webpage have not been installed, the script calls the installation control list determination module and determines the information of ActiveX controls requiring updates (step 606).

If the information of ActiveX controls requiring updates is determined, the script calls the module for downloading the corresponding ActiveX controls. The procedures are performed for downloading the corresponding ActiveX controls (step 608). The called modules download the corresponding ActiveX controls using the address information included in the XML parameter. The received ActiveX controls are installed in the installation paths included in the XML parameter (step 610).

According to the procedures illustrated in FIG. 6, the information of ActiveX controls necessary for the operation of the webpage is not included in the webpage in a form of an OBJECT tag. Rather, such information is included in the webpage in a form of an XML parameter or in another format. Also, the script calls the modules (functions) of the installed integrated ActiveX control, and controls the procedures of installing the required ActiveX controls.

According to the method described above, a security warning message is displayed on the web browser only when installing the integrated installer ActiveX control. When installing other ActiveX controls provided by the same service provider later, the ActiveX controls can be installed without any security warning messages displayed.

Second Embodiment

The first embodiment related to the case of installing ActiveX controls required in a webpage through an integrated installer ActiveX control, and script which calls modules of the integrated installer ActiveX control. In the first embodiment, all of the modules for ActiveX control installation are included in the integrated installer ActiveX control, so that the size of the webpage data is increased. Also, when the logic for installing ActiveX controls is updated, the integrated installer ActiveX control also needs to be updated, in which case a security warning message is unavoidably displayed.

In a second embodiment, a method for installing ActiveX controls necessary for the operation of the webpage includes cooperating the integrated installer ActiveX control with the control installation execution file installed in the client.

In the second embodiment, the logic for managing and executing the control installation execution file is included in the integrated installer ActiveX control. The logic for actually downloading and installing ActiveX controls is included in the control installation execution file. The structure and actions of the second embodiment will now be described in detail with reference to the drawings.

Figure 8:
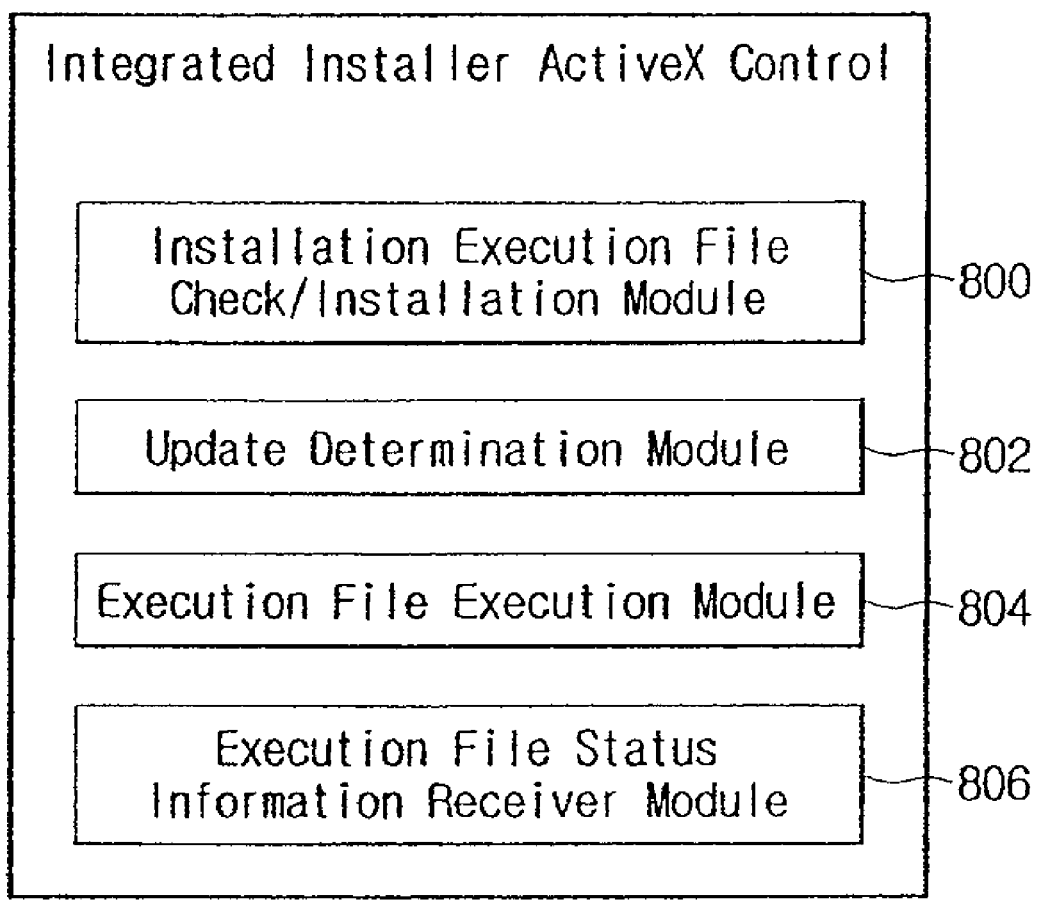
FIG. 8 illustrates the module structure of an integrated installer ActiveX control according to a second embodiment.

FIG. 8 illustrates the module structure of an integrated installer ActiveX control according to the second embodiment. Referring to FIG. 8, the integrated installer ActiveX control may include a control installation execution file check/installation module 800, an update determination module 802, an execution file execution module 804, and an execution file status information receiver module 806.

The control installation execution file check/installation module 800 determines whether or not the control installation execution file has been normally installed in the client. If not, the control installation execution file check/installation module 800 installs the control installation execution file in the client. The address information by which the control installation execution file may be received may be coded within the integrated installer ActiveX control, or may be included in the webpage data.

The update check module 802 determines whether or not ActiveX controls necessary for the operation of the webpage are installed. In the first embodiment described above, the update check module determines whether or not updates were required using the information of the XML parameter. Similarly, in the second embodiment, the update check module 802 may determine whether or not updates are required using the XML parameter. In other embodiments, concise information of the ActiveX controls that need to be installed may be recorded in the script or in another part of the webpage. The determining of whether or not updates are required may be performed using the recorded information. In this case, a more detailed determination of whether or not updates are required may be performed by the control installation execution file.

The execution file execution module 804 is called when it is needed to install an ActiveX control, and executes the control installation execution file installed in the client. The execution file execution module 804 provides the XML parameter included in the webpage to the execution file, when executing the control installation execution file.

The executed execution file determines the ActiveX control information that will be installed using the information included in the XML parameter, and downloads and installs the corresponding ActiveX controls. The execution file provides status information related to ActiveX installation to the integrated ActiveX control. Through the provided status information, the execution file status information receiver module 806 checks whether or not the ActiveX controls are installed normally by the execution file.

Figure 9:
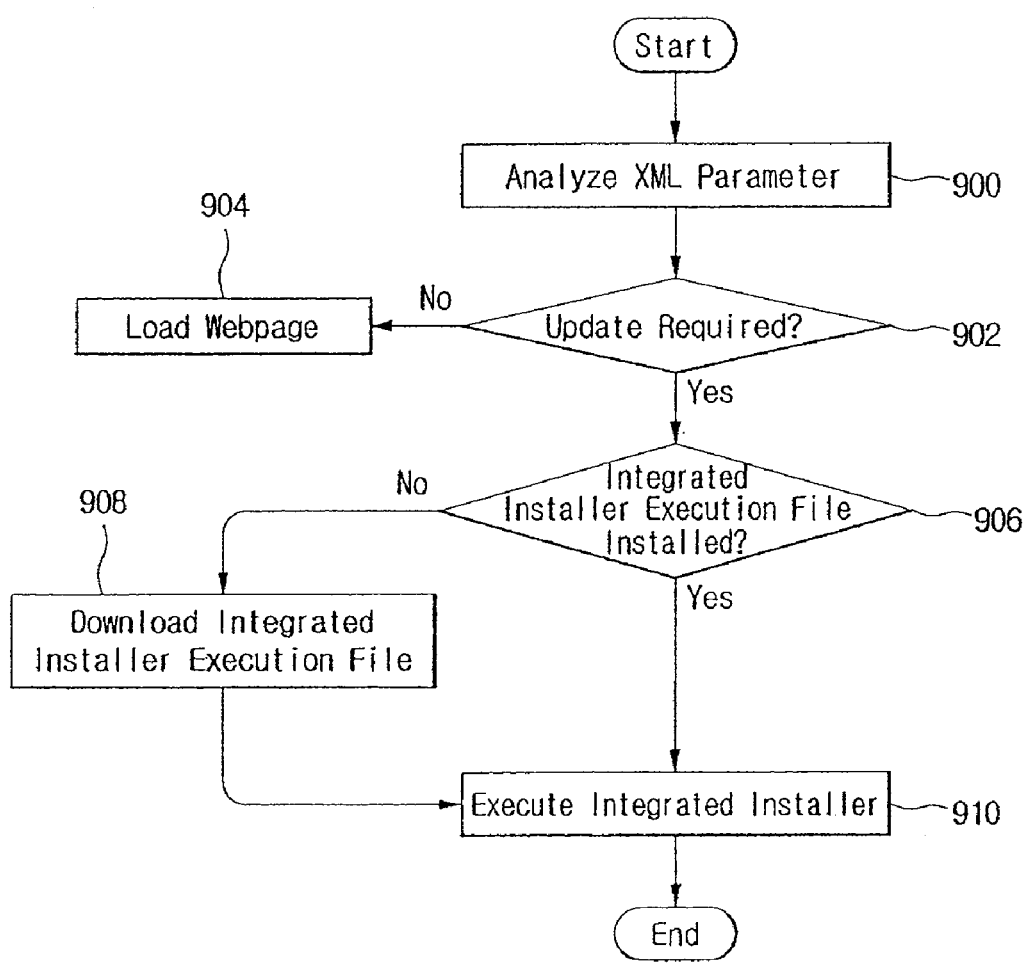
FIG. 9 is a flowchart illustrating a method for installing an ActiveX control according to the second embodiment.

FIG. 9 is a flowchart of a method for installing ActiveX controls according to the second embodiment. Referring to FIG. 9, the script calls the update determination module of the integrated installer ActiveX control. The update determination module determines the information of the ActiveX controls necessary for the operation of the webpage using information contained in the webpage or in the XML parameter (step 900). In certain embodiments, in order to simplify the actions of the ActiveX control, whether to update is determined through the information of the required ActiveX controls contained in the webpage rather than through the XML parameter. Here, the information contained in the webpage may include the file name, version, and size information of the ActiveX controls.

If an update is not required for the ActiveX controls, the webpage is loaded (step 904). If ActiveX controls necessary for the operation of the webpage have not been installed, the script calls the module which deals with checking and installing the control installation execution file from the integrated installer ActiveX control. The called module determines whether or not the control installation execution file has been normally installed in the local client (step 906).

If the control installation execution file has not been installed in the client, the process proceeds to receiving and installing the control installation execution file using the address contained in the webpage (step 908).

If the control installation execution file has been previously installed, or has been installed by step 908, the control installation execution file is executed (step 910). The control installation execution file performs the operation of receiving and installing the required ActiveX controls. As described above, the integrated installer ActiveX control provides information of the XML parameter to the execution file, when executing the control installation execution file.

Figure 10:
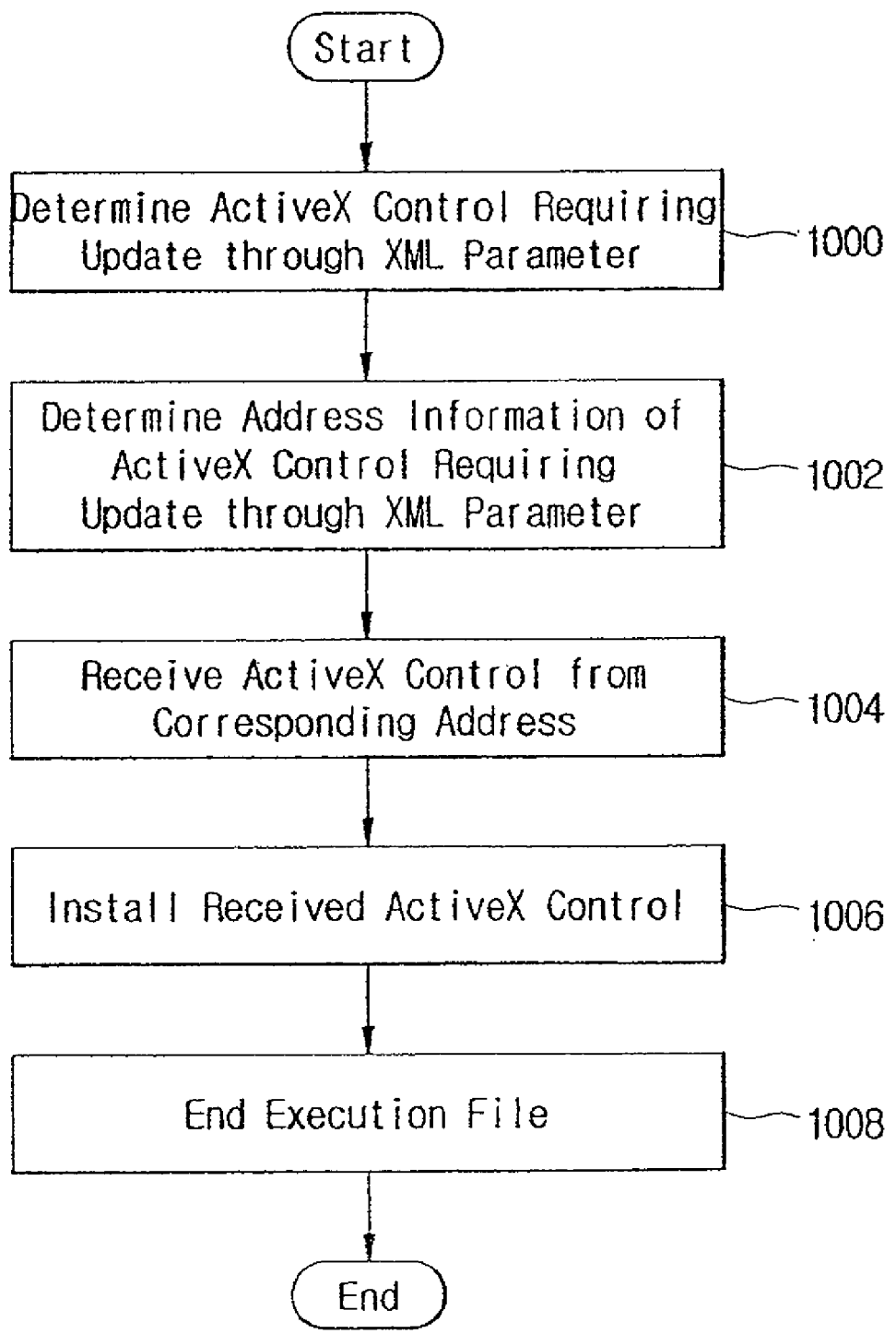
FIG. 10 is a flowchart illustrating actions of a control installation execution file according to the second embodiment.

FIG. 10 is a flowchart of the actions of the control installation execution file according to the second embodiment. Referring to FIG. 10, the control installation execution file determines the information of ActiveX controls that require updates, using the XML parameter provided from the integrated installer ActiveX control (step 1000). The second embodiment may also use an XML parameter having the same field structure as that of the first embodiment.

When the information of ActiveX controls is determined for updates, the execution file determines the address information for the ActiveX controls to be requested, using the address information included in the XML parameter (step 1002), and receives the ActiveX controls from the corresponding addresses (step 1004). The execution file installs the received files in the corresponding paths, using the information of the installation path field of the XML parameter (step 1006).

When the installation of ActiveX controls is complete, the execution file returns the information that the installation was successful to the integrated installer ActiveX control (step 1008). The execution file may provide not only the information related to successful installation but also status information of operation to the integrated installer ActiveX control, so that the integrated installer ActiveX control may check the status of the execution file.

Although not illustrated in FIG. 10, operations of recording information for deleting installed ActiveX controls may additionally be performed.

According the second embodiment set forth above, the integrated installer ActiveX control provides only the XML parameter to the control installation execution file, and the actual ActiveX control installation procedures are performed by the control installation execution file. Therefore, when the logic for installing controls is modified, only a new control installation execution file may be installed, while the integrated installer ActiveX control does not have to be renewed, so that the number of security warning messages displayed on the web browser may be minimized. Also, since the webpage does not have to include a module for installing ActiveX controls, the data of the webpage may be reduced compared to the case of the first embodiment.

Third Embodiment

In a third embodiment, a method of minimizing the data size of an XML parameter included in a webpage during the integrated installation of ActiveX controls is provided.

In the first and second embodiments, the XML parameter having a field structure such as that shown in FIG. 7 is included in the webpage data. Also, the XML parameter may further include fields other than those illustrated in FIG. 7. Since ActiveX controls are downloaded at the first time that a user visits the corresponding webpage or when the ActiveX controls of the corresponding webpage are renewed, it may be redundant to include an XML parameter having several fields such as those shown in FIG. 7 in the webpage.

Figure 2:
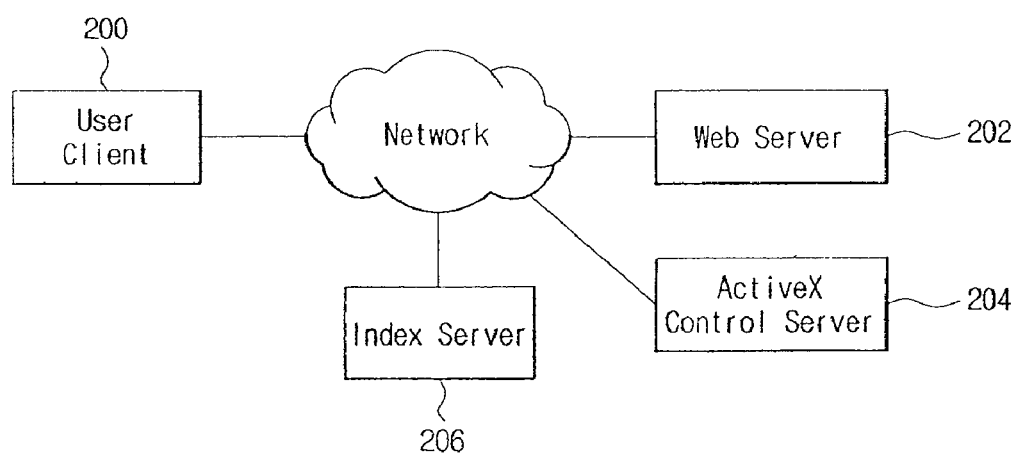
FIG. 2 is a block diagram illustrating another embodiment of a system for installing ActiveX controls.

FIG. 2 illustrates the structure of a system to which a method for integrated installation of ActiveX controls based on the third embodiment may be applied. The system may include a user client 200, a web server 202, an ActiveX control server 204, and an index server 206. Although FIG. 2 illustrates the web server 202, ActiveX control server 204, and index server 206 as independent servers, those skilled in the art will appreciate that they may also be implemented as a single server.

Compared with the system of FIG. 1, the system of FIG. 2 additionally includes the index server 206. The index server 206 serves to store indices of all or some of the ActiveX controls provided by the service provider.

Figure 11:
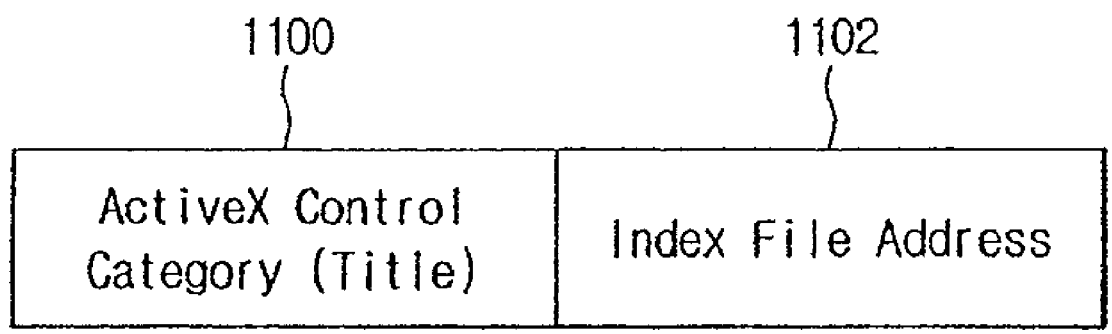
FIG. 11 illustrates the field structure of an XML parameter according to a third embodiment.

FIG. 11 illustrates the field structure of the XML parameter according to the third embodiment. The XML parameter included in the webpage in the third embodiment includes only the category (title) of the ActiveX controls necessary for the operation of the webpage and the address information of an index file provided by the index server.

In the third embodiment, detailed information of ActiveX controls necessary for the operation of the webpage are provided from the index server as an index file. The ActiveX controls to be installed can be determined after analyzing the index file.

The index file provided by the index server may include data in a form of XML. The field structure may be identical to the structure of FIG. 7. That is, the index file may include field information data such as that in FIG. 7 for all or some ActiveX controls provided by the service provider.

Therefore, the address information of ActiveX controls that need to be installed may be obtained from the index file through the category (title) information. The ActiveX controls may be downloaded and installed from the corresponding addresses. Thus, according to the third embodiment, while the data size of the XML parameter can be minimized and the required ActiveX controls are determined through index file, the installation procedures of ActiveX controls may become complicated.

However, since ActiveX controls are installed only at the first visit to the corresponding page or when the ActiveX control version of the corresponding page is renewed, the overall process is more efficient, compared to those of the first and second embodiments, despite that the installation procedures of ActiveX controls may become more complicated. The method of determining ActiveX controls that need to be installed through an index file may be applied to both the first and second embodiments.

Figure 12:
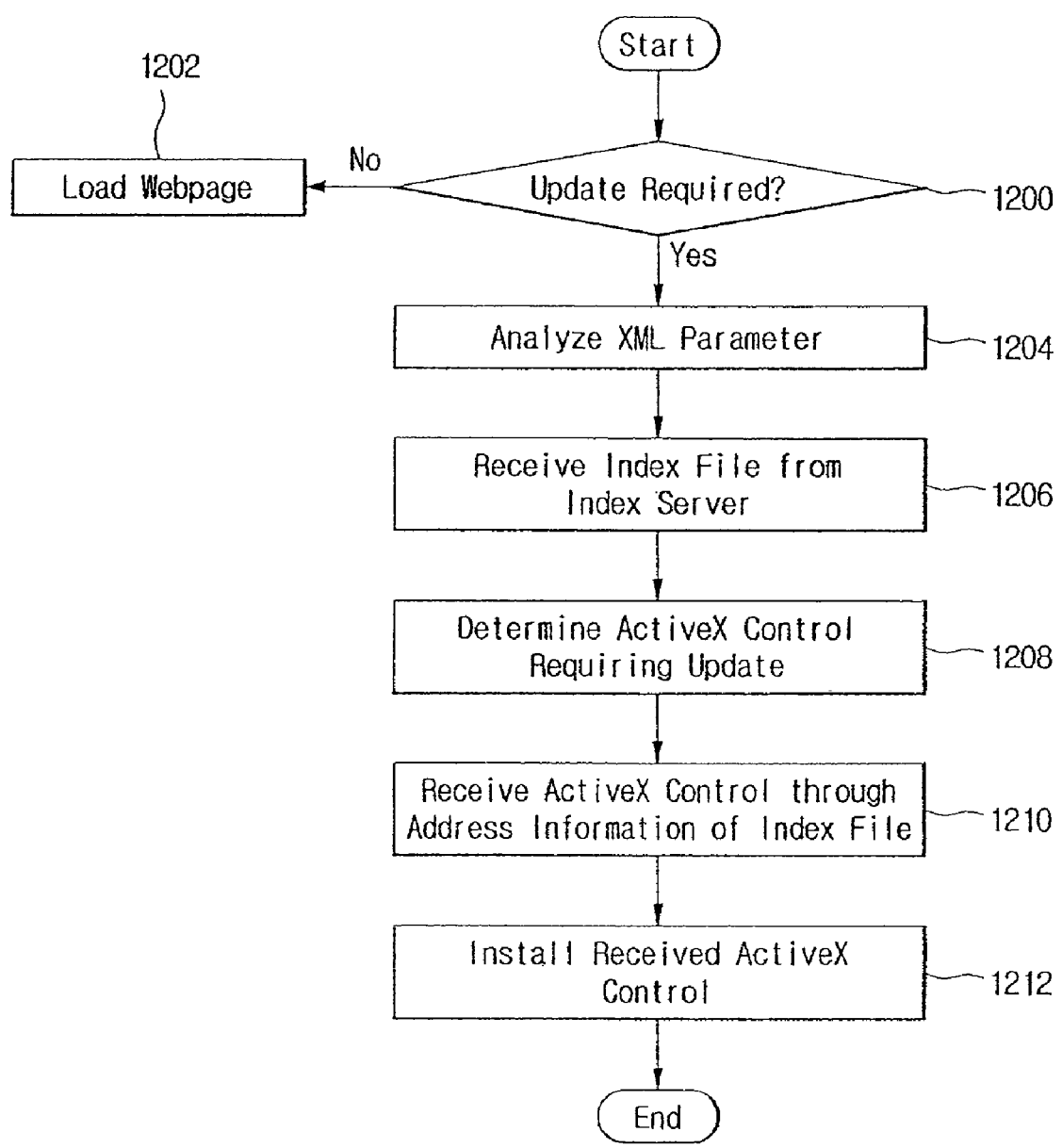
FIG. 12 is a flowchart illustrating a method for installing ActiveX controls according to another embodiment.

FIG. 12 is a flowchart of a method for installing ActiveX controls when the third embodiment is applied to the first embodiment. Referring to FIG. 12, it is first determined whether or not ActiveX controls necessary for the operation of the webpage have been installed in the client (step 1200). If an XML parameter is included in the webpage, it may be determined whether or not ActiveX controls necessary for the operation of the webpage are installed, using the information of the XML parameter.

In the third embodiment, since the XML parameter does not include detailed information of ActiveX controls that need to be installed, concise information (file name, size, and version, etc.) of the ActiveX controls that need to be installed may be recorded in the script or in other parts of the webpage data. The determining of whether or not ActiveX controls necessary for the operation of the webpage have been installed may be performed using the recorded information.

If the required ActiveX controls have been installed, the webpage is loaded (step 1202). If not, the XML parameter included in the webpage is analyzed (step 1204).

The integrated installer ActiveX control receives the index file using the index file address of the XML parameter (step 1206). The integrated installer ActiveX control determines the ActiveX control files corresponding to the categories (titles) of the XML parameter, using the category (title) information in the XML parameter (step 1208). For example, if an ActiveX control category in the XML parameter is music, those ActiveX control files whose category information is music is found from the index file.

The integrated installer ActiveX control finds the ActiveX controls that require updates from the index file. The integrated installer ActiveX control then receives the corresponding ActiveX control data (step 1210) and installs the received ActiveX controls (step 1212) using the information of the address field in the corresponding ActiveX control.

Figure 13:
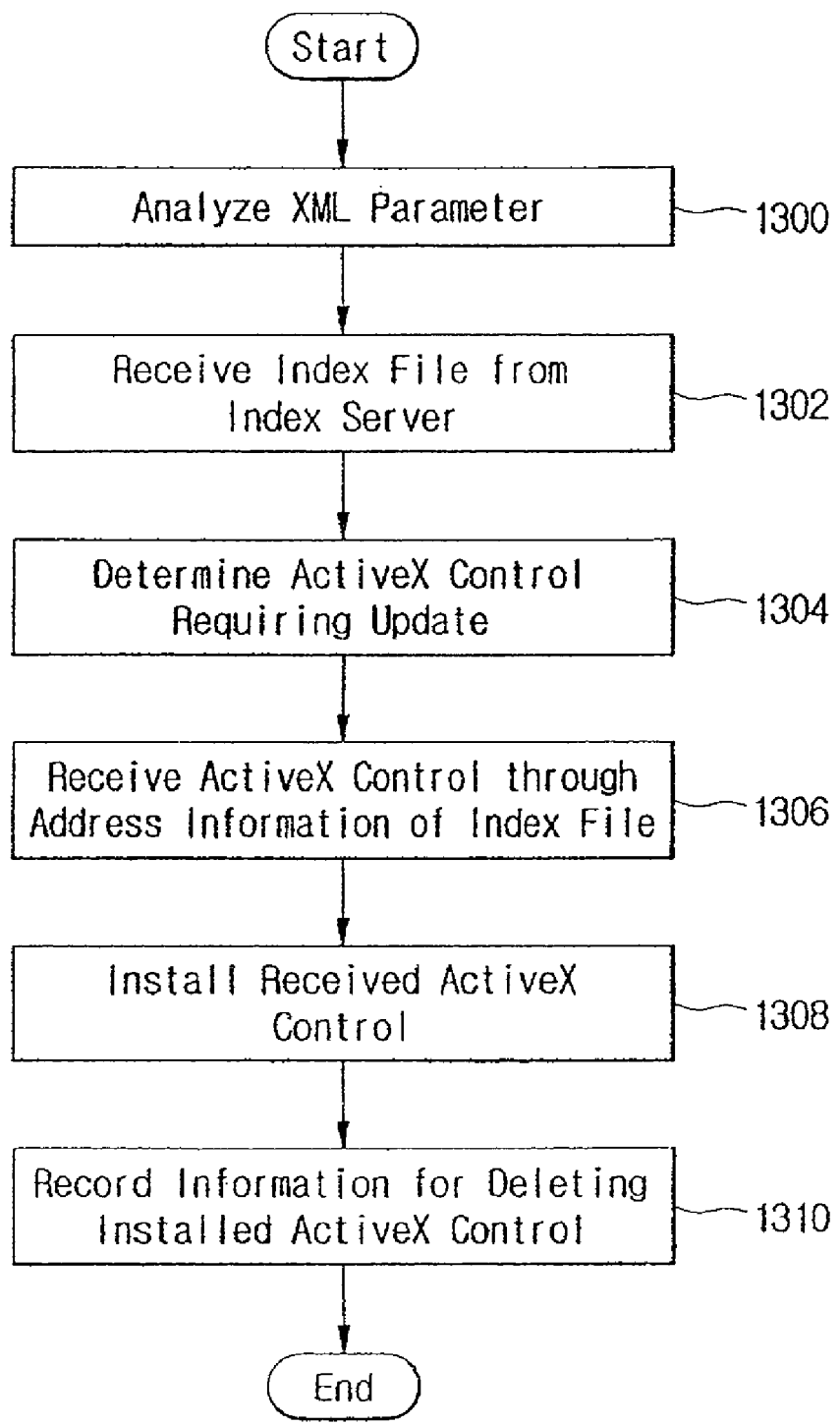
FIG. 13 is a flowchart illustrating a method for installing an ActiveX control according to yet another embodiment.

FIG. 13 is a flowchart of a method for installing ActiveX controls when the third embodiment is applied to the second embodiment. FIG. 13 relates to the operation of the control installation execution file. Since the operation of the control installation execution file is identical to the operation of the integrated installer ActiveX control of FIG. 12, detailed description is omitted.

However, the control installation execution file may additionally perform a step of recording information for deleting installed ActiveX controls (step 1310), so that the deleting of installed ActiveX controls may be performed by the control installation execution file.

In a conventional method, to delete an installed ActiveX control, the corresponding file itself has to be found and deleted. However, by installing an ActiveX control using a control installation execution file as in the second embodiment, the information for deleting the control may be recorded in the program, so that the installed ActiveX control may be deleted in a much simpler manner.

Figure 14:
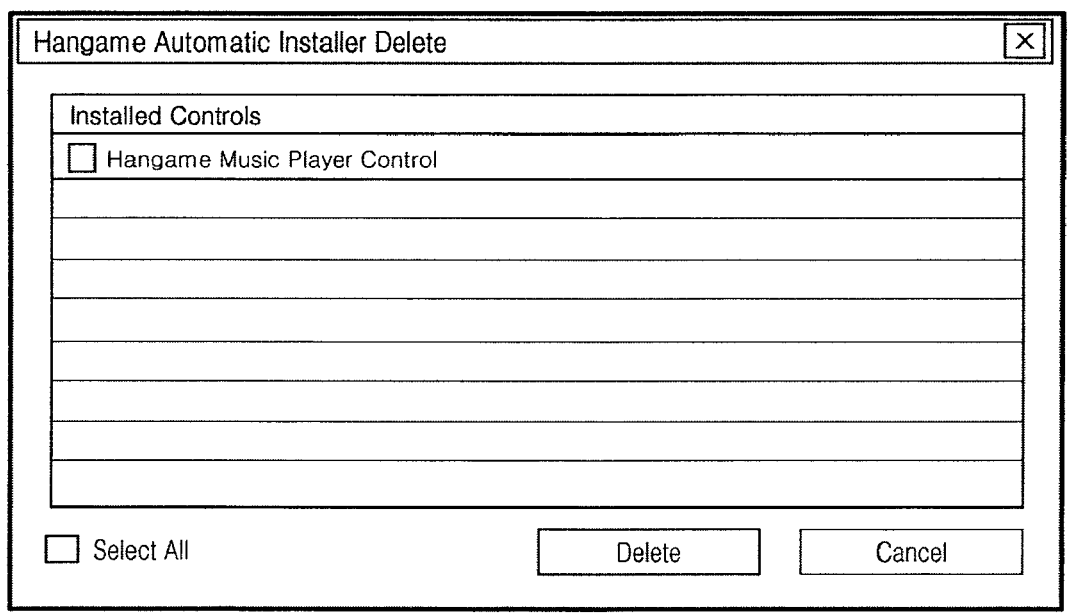
FIG. 14 illustrates one embodiment of a user interface provided in a control installation execution file for deleting ActiveX controls.

FIG. 14 illustrates an example of a user interface provided in a control installation execution file for deleting ActiveX controls. As shown in FIG. 14, by providing a list of installed controls and a button for requesting deletion of the controls, a user may readily delete the installed ActiveX controls.

In the embodiments described above, ActiveX controls may be installed without security warning messages in webpages provided by the same service provider, by a pre-installed integrated installer ActiveX control for automatically installing ActiveX controls. In addition, web services may be provided to a user in a facilitated manner, by allowing ActiveX controls to be installed without security warning windows for webpages provided by certain service providers trusted by the user.

While the spirit of the invention has been described in detail with reference to certain embodiments, it is to be appreciated that those skilled in the art can change or modify the embodiments without departing from the scope and spirit of the invention.

What is claimed is:

1. A method of installing an integrated ActiveX control installer and an ActiveX control, the method comprising:
    receiving, from a terminal associated with a user, a request for an Internet webpage;
    sending data for the Internet webpage and presenting an inquiry to the user as to whether the user agrees to install an integrated ActiveX control installer in the terminal;
    upon agreement by the user, sending the terminal data for installing the integrated ActiveX control installer as an ActiveX control to install the integrated ActiveX control installer in the terminal;
    instructing to install and execute, by the integrated ActiveX control installer, an execution file in the terminal, the execution file being a file to be installed and executed separately from the integrated ActiveX control installer for installing ActiveX controls;
    instructing to send, by the integrated ActiveX control installer, the execution file a list of ActiveX controls to install in the terminal; and
    instructing to install, by the execution file, a first ActiveX control for viewing or processing web content in the terminal.

2. The method of claim 1, wherein the Internet webpage includes information on the integrated ActiveX control installer, and wherein the information comprises an OBJECT tag and an Internet address from which the integrated ActiveX control installer is available for downloading.

3. The method of claim 2, further comprising accessing a first webpage associated with the web content, wherein the first webpage includes information associated with the first ActiveX control.

4. The method of claim 3, wherein the information associated with the first ActiveX control is in the form of an XML parameter.

5. The method of claim 3, wherein the first webpage does not include an Internet address from which the first integrated ActiveX control installer is available for downloading.

6. The method of claim 1, wherein the integrated ActiveX control installer is configured to receive an index file comprising information on the ActiveX controls.

7. The method of claim 1, wherein the Internet webpage is one of associated webpages provided by an Internet service provider, and wherein at least one of the ActiveX controls are required for viewing or processing web content available from the associated webpages.

8. The method of claim 7, wherein the associated webpages share at least a portion of their URLs.

9. A method of managing an ActiveX control, the method comprising:
   receiving, from a terminal associated with a user, a request for an Internet webpage comprising content that requires a first ActiveX control in order to view or process the content, the terminal comprising an integrated ActiveX control installer as an ActiveX control that has been installed therein, and the integrated ActiveX control installer comprising a list of ActiveX controls to be installed in the terminal;
   executing the integrated ActiveX control installer so as to determine whether an execution file has been installed in the terminal, the execution file being a file to be installed and executed separately from the integrated ActiveX control installer for installing ActiveX controls;
   sending the terminal data for installing the execution file to install the execution file in the terminal;
   instructing to provide the installed execution file with data for installing a first ActiveX control; and
   instructing to download and install, by the execution file, the first ActiveX control in the terminal
   so as to enable the terminal to view or process the content.

10. The method of claim 9, wherein the execution file determines whether the first ActiveX control has been installed in the terminal.

11. The method of claim 9, wherein the terminal receives the data for installing the first ActiveX control from a server other than a server for the Internet webpage.

12. A method of installing an integrated ActiveX control installer, the method comprising:
   receiving, by a server, a request for an integrated ActiveX control installer, which is an ActiveX control, from a terminal connected to the server via the Internet;
   transmitting, by a server, data for installing the integrated ActiveX control installer to the terminal;
   instructing to install and execute the integrated ActiveX control installer in the terminal,
   instructing to download and install, by the integrated ActiveX control installer, an execution file in the terminal, the execution file being a file to be installed and executed separately from the integrated ActiveX control installer for installing ActiveX controls; and
   instructing to install, by the execution file, a first ActiveX control for viewing or processing web content in the terminal.

13. The method of claim 12, wherein the server comprises two or more networked computers, wherein the receiving and transmitting are carried out by a single computer or two computers belonging to the two or more networked computers.

14. A method of installing an integrated ActiveX control installer, the method comprising:
   receiving, from a terminal, a request for a webpage; and
   transmitting, from a server of the webpage to the terminal, data for initiating an installation process of the integrated ActiveX control installer as an ActiveX control in the terminal, wherein the installation process requires consent for the installation by a user of the terminal;
   the installation process comprising:
      sending the terminal data for installing the integrated ActiveX control installer to install the integrated ActiveX control installer in the terminal;
      instructing to install and execute, by the integrated ActiveX control installer, an execution file in the terminal, the execution file being a file to be installed and executed separately from the integrated ActiveX control installer for installing ActiveX controls;
      instructing to send, by the integrated ActiveX control installer, the execution file a list of ActiveX controls to install in the terminal; and
      instructing to install, by the execution file, a first ActiveX control for viewing or processing web content in the terminal.

15. The method of claim 14, wherein the data comprises an Internet address from which the integrated ActiveX control installer is available for downloading.

16. The method of claim 14, wherein the requested webpage comprises second web content, which requires a second ActiveX control to view or process the second web content, and wherein the list comprises the second ActiveX control.

17. The method of claim 1, wherein the integrated ActiveX control installer is configured to maintain the list of the ActiveX controls and to determine whether the first ActiveX control is included in the list in response to the terminal's attempt to receive the web content requiring the first ActiveX control for viewing or processing the web content.

18. The method of claim 1, the integrated ActiveX control installer comprising:
   an installation module to install the execution file in the terminal; and
   an execution module to execute the execution file to perform installation of the first ActiveX control in the terminal.

* * * * *